United States Patent [19]
DeBacker et al.

[11] Patent Number: 5,806,408
[45] Date of Patent: Sep. 15, 1998

[54] BEVERAGE BREWING DEVICE

[76] Inventors: Johanna N. DeBacker, 4738 Country Walk La., Sylvania, Ohio 43560; Radoslav P. Kotorov, 205 W. Washington, Bowling Green, Ohio 43402; George S. Mihov, 24 Baden Rd., Bristol, England, BS59Qf

[21] Appl. No.: 742,343

[22] Filed: Nov. 1, 1996

[51] Int. Cl.⁶ .................................................. A47J 31/00
[52] U.S. Cl. .................................. 99/295; 99/319; 99/322
[58] Field of Search ........................... 99/279, 295, 317, 99/318, 319, 321, 322

[56] References Cited

U.S. PATENT DOCUMENTS

| | | |
|---|---|---|
| 194,703 | 8/1877 | Mayerhofer . |
| 1,417,243 | 5/1922 | Graves .................................... 99/319 X |
| 1,525,490 | 2/1925 | Baker ......................................... 99/319 |
| 1,728,381 | 9/1929 | Waters ....................................... 99/319 |
| 1,873,023 | 8/1932 | Peirce . |
| 1,982,846 | 12/1934 | Wales . |
| 2,053,021 | 9/1936 | Cassol . |
| 2,174,096 | 9/1939 | Shaw ...................................... 99/322 X |
| 2,311,759 | 2/1943 | Johnson . |
| 2,749,834 | 6/1956 | Hiscock . |
| 3,370,524 | 2/1968 | Kasakoff . |
| 3,657,993 | 4/1972 | Close . |
| 3,906,847 | 9/1975 | Itasaka et al. . |
| 4,627,334 | 12/1986 | Shanklin . |
| 4,746,519 | 5/1988 | Wright et al. . |
| 4,867,993 | 9/1989 | Nordskog . |
| 4,997,015 | 3/1991 | Johnson . |
| 5,168,793 | 12/1992 | Padamsee . |
| 5,453,189 | 9/1995 | Joergensen . |
| 5,478,586 | 12/1995 | Connor . |

*Primary Examiner*—Reginald L. Alexander
*Attorney, Agent, or Firm*—Emch, Schaffer, Schaub & Porcello Co., L.P.A.

[57] ABSTRACT

The invention is a brewing device having a lid member with a collapsible liquid permeable pouch secured to the lid member. The substance to be brewed is contained in said pouch. The pouch is disposed to extend from said lid member when the brewing substance is brewed. There is also a device for positioning the pouch adjacent the lid member when the brewing substance is not being brewed. There is also disclosed a package for containing a brewing substance. The package has a lid member and a collapsible liquid permeable pouch having a first end. The first end of the pouch is secured to the lid member. The pouch contains the substance to be brewed. The pouch is retained adjacent the lid member when the brewing substance is being stored. The pouch extends from the lid member when the brewing substance is to be brewed. The pouch is designed to retain the brewing substance in the pouch during and after the beverage is brewed.

23 Claims, 4 Drawing Sheets

BEVERAGE BREWING DEVICE

FIELD OF THE INVENTION

The present invention relates to a beverage brewing device and a package for containing a brewing substance.

BACKGROUND OF THE INVENTION

Coffee or tea has become the drink of choice for many individuals throughout the world. The popularity of coffee and tea continue to grow with no end in sight. The Specialty Coffee Association of America predicts that the popularity of coffee and tea, with special emphasis on specialty or estate coffee, will continue to grow with no end in sight. As "grocery store" coffee becomes more expensive, cost differences between the generic coffee and specialty coffee have narrowed. Coffee drinkers, paying more for coffee of any quality, are becoming more discriminating in their demands for a good brew and in their efforts to make that perfect cup more convenient. With the growing number of flavors, blends, varietals and decaffeinated coffees, a process that allows the consumer to have a variety of choices, for every cup they drink, would make the perfect cup easy and accessible. As a result, many coffee and tea drinkers are seeking ways to improve the flavor and quality of the brewed beverage. Additionally, many coffee and tea drinkers enjoy activities such as backpacking, bicycle touring, foreign travel, and other activities which prohibit conventional brewing techniques.

One popular method of making coffee or tea is to use a French coffee press. This type of coffee maker consists of a glass decanter having a cap with a coffee press slidably mounted within the cap. Ground coffee or tea leaves are place within the decanter and hot water is added to the decanter. The coffee or tea and hot water are allowed to steep until the proper flavor is imparted to the beverage, according to the user's preference. A coffee press of the prior art includes a filter that closely fits the interior of the decanter. The press is pushed down through the hot liquid, collecting the used coffee grounds or tea leaves beneath the filter. When the filter reaches the bottom of the decanter, it traps the used coffee grounds or tea leaves between the filter and the bottom of the decanter. This process allows the natural oils from the bean to stay in the drink and results in rich, fullbodied brew for consumption. The resulting coffee or tea is poured out of the decanter into a mug for consumption.

French coffee presses produce high-quality coffee or tea, however, they suffer disadvantages making them inconvenient and cumbersome for many users: for example, in addition to the coffee press unit, the user must carry an additional mug from which to drink the beverage. Additionally, many users find that permitting the coffee grounds or used tea leaves to remain in the pot after brewing causes an unpleasant or bitter taste in the brewed beverage. Further, the coffee cools off quickly in a glass decanter, and for travel, the glass is a deterrent due to the risk of breakage.

The prior art brewing devices require the user to carry a separate supply of the substance that is to be brewed. In many instances, this also requires the user to have a coffee or tea grinder to properly prepare the coffee or tea that is to be brewed. A brewing device containing the exact amount of coffee would ensure consistently great coffee while allowing variety with every cup. The brewing device would not be limited to a disposable cup but could be used on different containers including ceramic or glass.

It would be desirable to have a light weight portable brewing device that includes the substance to be brewed. The brewing device could be disposable and designed to work with different types of containers from which the user could drink the brewed beverage. The brewing device would provide a package for storing the substance to be brewed in a manner to retain the flavor and freshness of the substance to be brewed.

SUMMARY OF THE INVENTION

The present invention is directed to a brewing device having a lid member with a collapsible liquid permeable pouch secured to the lid member. The substance to be brewed is contained in said pouch. The pouch is disposed to extend from said lid member when the brewing substance is brewed. There is also a means for positioning the pouch adjacent the lid member when said brewing substance is not being brewed. There is also disclosed a package for containing a brewing substance. The package has a lid member and a collapsible liquid permeable pouch having a first end. The first end of the pouch is secured to the lid member. The pouch contains the substance to be brewed. The pouch is retained adjacent the lid member when said brewing substance is being stored. The pouch extends from the lid member when the brewing substance is to be brewed. The pouch is designed to retain the brewing substance in the pouch during and after the beverage is brewed.

Other objects and advantages of the present invention shall become apparent to those skilled in the art upon a review of the following detailed description of the preferred embodiments and the accompanying drawings.

DETAILED DESCRIPTION OF THE PREFERRED EMBODIMENT

The invention relates to a device for brewing a beverage. More particularly, the invention is directed to a lid member that can be positioned over a container and the lid contains the substance that is to be brewed in the container. The invention will be described as being used to brew coffee or tea for the sake of simplifying the disclosure. However, it should be understood that the invention can be used to brew almost any substance. The details of the invention will be set forth more fully in the following description with reference made to the attached drawings.

Figure 1:
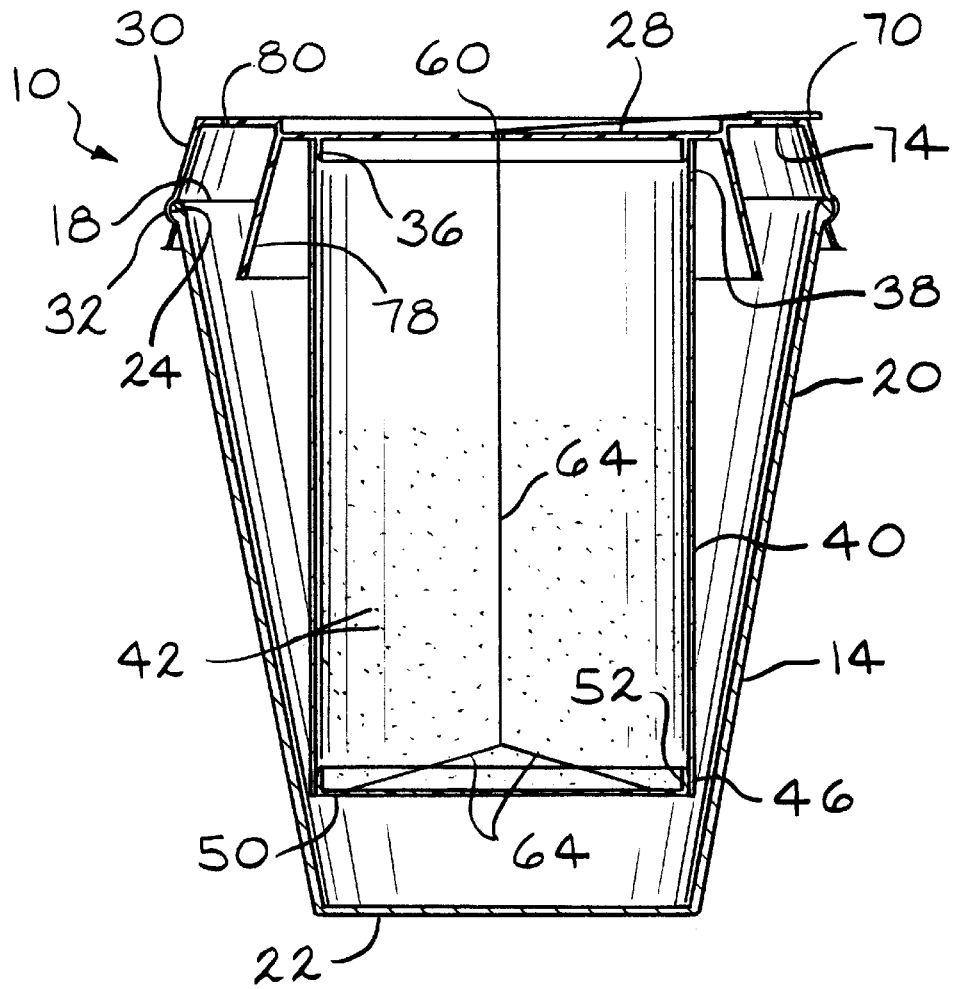
FIG. 1 is a cross sectional view of the brewing device.

On FIG. 1, the brewing device 10 is shown positioned on a container 14. The container 14 is generally cylindrical and there is an opening 18 in one end of the container. A side wall 20 and a bottom wall 22 define the rest of the container 14. A lip 24 can also be positioned on the side wall 20 of the container 14 adjacent the opening 18. Although the container 14 is being described as generally cylindrical, it should understood that other shapes and configurations for the container can be utilized without departing from the invention.

The brewing device 10 is usually in the form of a lid 28 that is positioned over the opening 18 of the container 14. The lid can include a side wall 30 that extends over at least a portion of the container 14. The side wall 30 can also includes a groove 32 that is disposed in the side wall 30 to align with the lip 24 disposed on the side wall 20 of the container 14. The groove 32 and lip 24 are constructed so that the engagement of the groove with the lip 24 will act to secure the lid 28 to the container 14.

A flange 36 extends from the surface of the lid 28 that is designed to face the container 14. In the embodiment shown, the flange 36 is cylindrical in shape but is should be understood that other geometrical shapes can be utilized for the flange. Secured to the flange is the first end 38 of a collapsible liquid permeable pouch 40. The first end 38 of the pouch 40 is sealed or otherwise secured to the flange 36 to securely attach the pouch to the lid 28. The pouch 40 is formed of a liquid permeable material such as a perforated paper or plastic product. The pouch 40 is designed to contain the brewing substance 42 that is to be brewed in the container 14 within the pouch. However, the pouch 40 is designed so that liquid can enter the pouch and extract flavor from the brewing substance 42. The pouch 40 is designed to be collapsible in nature and in FIG. 1 the pouch 40 is shown in the non-collapsed or extended position wherein the brewing substance 42 is in position for brewing.

The second end 46 of the pouch 40 that is spaced apart from the lid 28 as shown in FIG. 1 can include a filter ring 50. The filter ring 50 has a side wall 52 to which the second end 46 of the pouch 40 is secured. Positioned on the filter ring 50 is a screen 54. A plurality of support arms 56 can extend from the filter ring 50 to help support the screen 54. The screen 54 is designed to allow liquid to pass through the screen but not to allow the brewing substance to pass through the screen. In practice, it has been found desirable to use a mesh type product for the screen 54. However, it should be understood that other materials, including the material used to form the pouch 40, can be used for the screen. The pouch 40 and filter ring 50 have been shown as being cylindrical. However, it should be understood that other shapes can be utilized for these components without departing from the invention.

Figure 2:
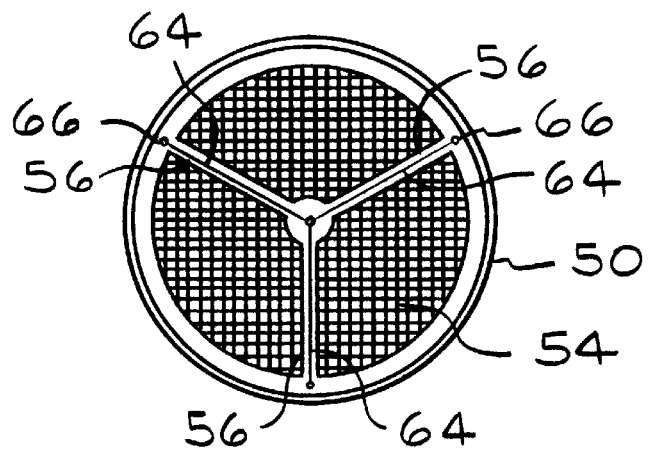
FIG. 2 is a top view of a portion of the brewing device.

A small aperture 60 is positioned in the lid 28 so the aperture is in communication with the interior of the pouch 40. A line 64 extends through the aperture 60, into the interior of the pouch 40 and is secured to the filter ring 50. As shown in FIG. 1 and FIG. 2, the line 64 is secured to the filter ring 50 in several locations. Apertures 66 are positioned around the periphery of the filter ring 50 for the purposes of allowing the line 64 to be secured to the filter ring.

Figure 3:
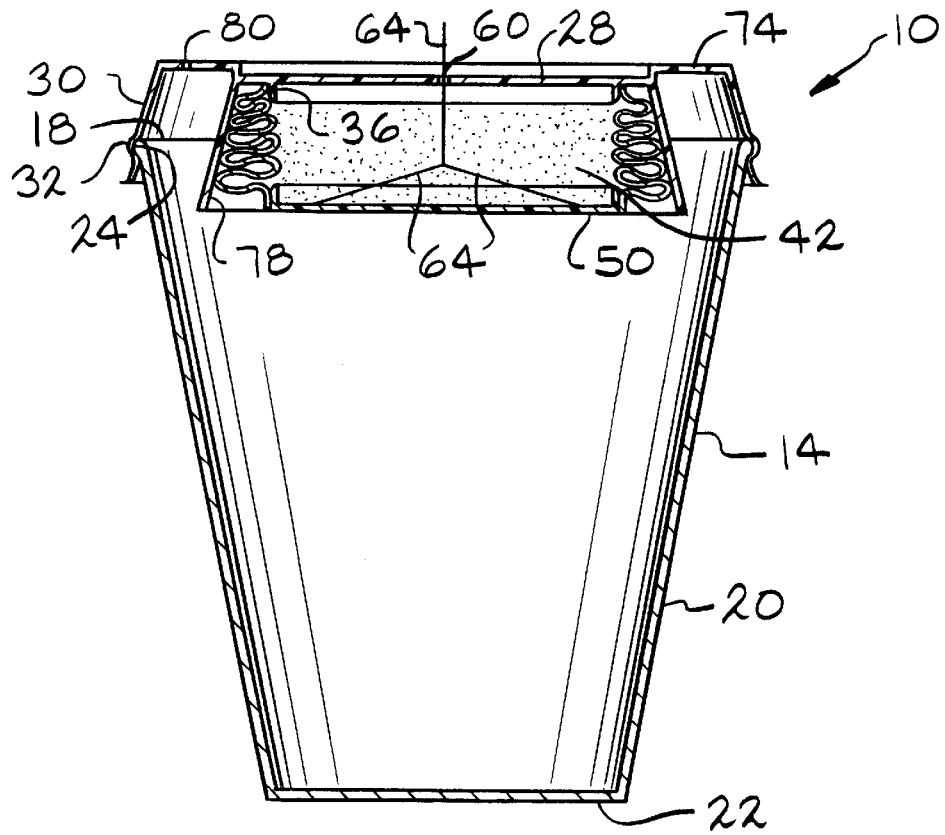
FIG. 3 is a cross sectional view of the invention.
Figure 4:
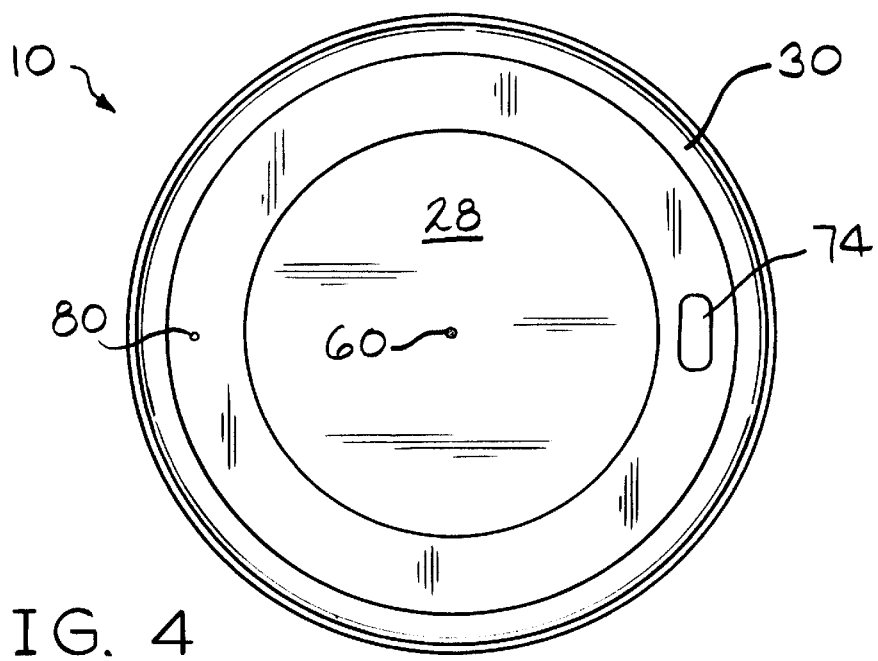
FIG. 4 is a top view of the invention.
Figure 6:
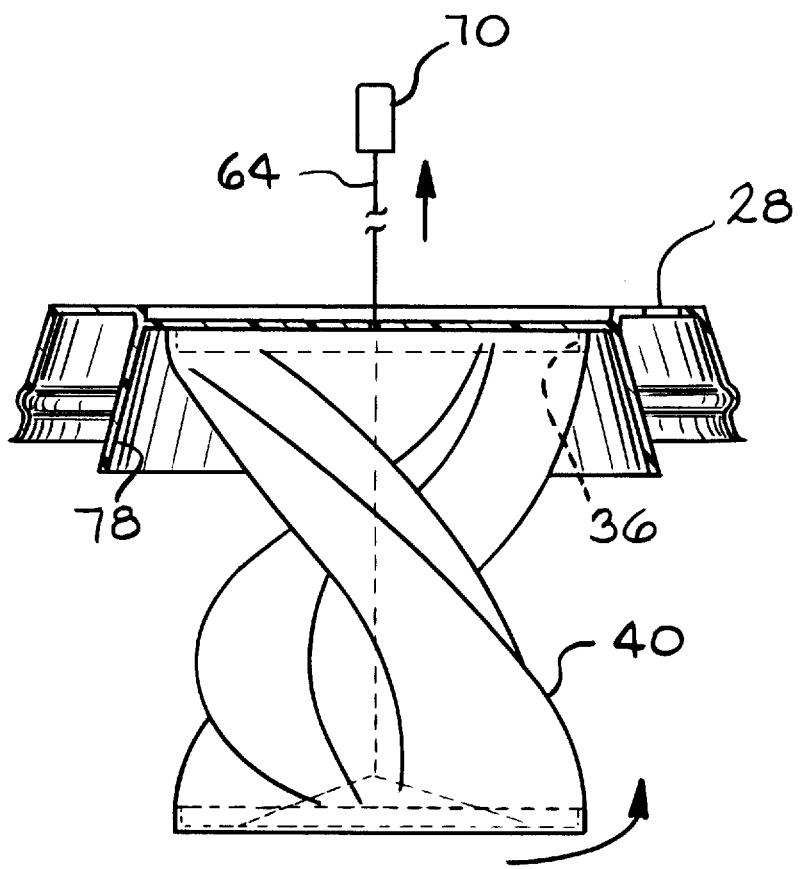
FIG. 6 is a cross sectional view of the brewing device.

A shown in FIG. 3, the line 64 can be used to collapse the pouch 40 so that the filter ring 50 is positioned adjacent the lid 28. The position for the pouch 40 shown in FIG. 3 is a storage position that is utilized prior to brewing the beverage and also a disposal position once the beverage has been brewed. In practice, it has been found to be particularly effective to have the pouch 40 twisted in a spiral-type fashion when the pouch is in position adjacent the lid 28. The pouch 40 untwists when the pouch is released to the brewing position shown in FIG. 1. FIG. 6 shows the pouch 40 in a partially extended position where the untwisting of the pouch is apparent as the pouch moves from the collapsed position of FIG. 3 to the fully extended position of FIG. 1. The twisting of the pouch helps to maintain the pouch 40 in the desired position when the pouch is adjacent the lid 28.

The end of the line 64 that extends from the lid 28 in a direction away from the pouch 40 has a tab 70 secured thereto. The tab 70 can be used to assist in advancing the line 64 in a direction so that the filter ring 50 advances toward the lid 28. The tab 70 also is large enough that it cannot pass through the aperture 60 in the lid 28 and therefore keeps the line 64 from dropping completely into the interior of the pouch 40.

A drinking opening 74 can be positioned on the surface of the lid 28. The drinking opening 74 allows the contents of the container 14 to be consumed without removing the lid 28 from the container 14. This is particularly useful when the container is used when travelling and the lid 28 is retained on the container 14 to prevent spillage. The drinking opening 74 can also be utilized when it is desired to retain the lid 28 on the container 14 to keep the beverage in the container 14 hot for a longer period of time. The tab 70 that is secured to the line 64 can have an adhesive material on one side thereof so that the tab 70 can be positioned over the drinking opening 74 to close the drinking opening. The adhesive can be of a type where the tab 74 can be repetitively secured over the drinking opening 74 to close this opening in the lid 28. The tab 74 can also be secured to the lid 28 or container 14 in a way to secure the line 64 in a position where the pouch 40 is retained adjacent the lid 28.

Positioned on the surface of the lid 28 that faces the container 14 is a positioning flange 78. The positioning flange 78 extends from the lid 28 in the same direction as the flange 36. However, the positioning flange 78 usually extends at least twice as far from the lid 28 as the flange 36. The positioning flange 78 is disposed so that it will position and retain the pouch 40 in a centered position on the lid 28 when the pouch 40 is in the storage position and when the pouch 40 is collapsed after brewing prior to disposal. The positioning flange 78 ensures that the pouch 40 will not cover the drinking aperture 74.

A vent 80 can also be positioned in the lid 28 to allow additional air to enter the container 14. The vent 80 assists in allowing the brewed substance to be consumed through the drinking aperture 74.

Figure 7:
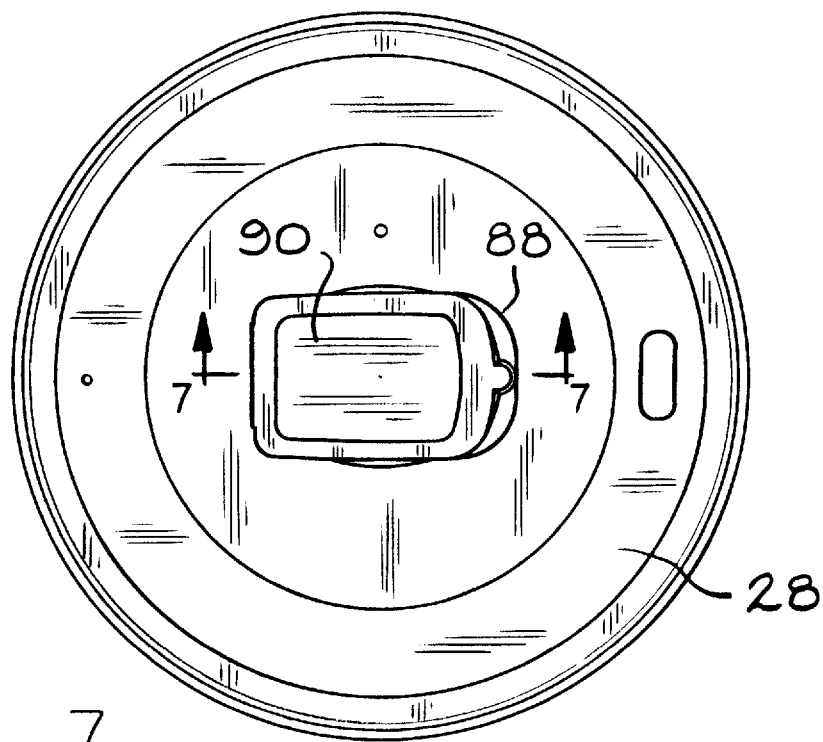
FIG. 7 is a top view of the invention.
Figure 8:
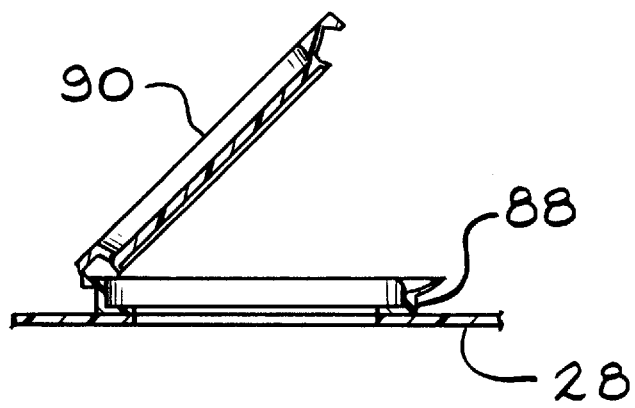
FIG. 8 is a cross sectional view taken along line 7—7 of FIG. 7.

An opening 88 can be positioned in the lid 28 as shown in FIGS. 7 and 8. A hinged tab 90 that is positioned in a manner that the hinged tab can securely close the opening 88. The hinged tab 90 is disposed so that it can be utilized to open and close the opening 88 in the lid 28. The opening 88 is positioned on the lid so that the opening is in communication with the pouch 40 that contains the brewing substance 42.

Figure 5:
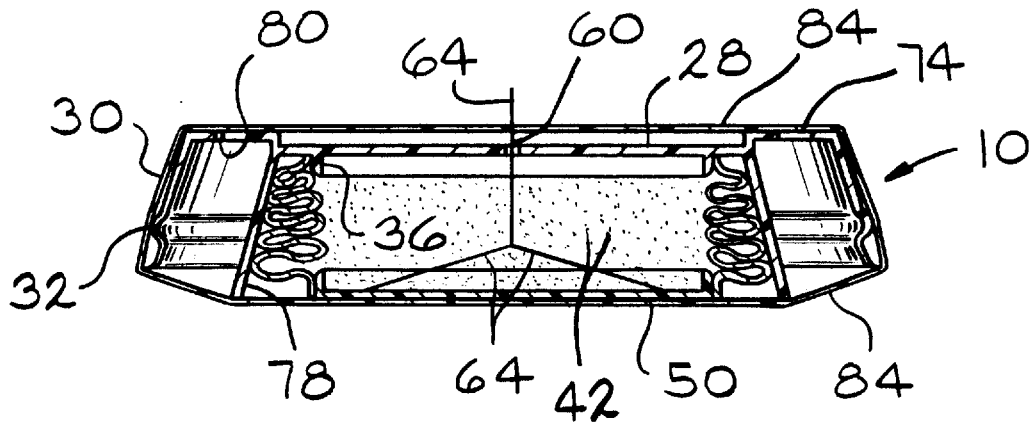
FIG. 5 is a cross sectional view of the brewing package of the present invention.

In use, the brewing device 10 is packaged in the storage position shown in FIG. 3. A quantity of a brewing substance 42 is positioned in the pouch 40 and the pouch 40 is retained in the collapsed positioned adjacent the lid 28. The brewing substance can be placed in the pouch 40 prior to securing the pouch to the flange 36 on the lid 28 or the brewing substance can be placed in the pouch through the opening 88 in the lid. As shown in FIG. 5, a cover 84 is positioned over the surface of the lid 28 to cover the aperture 60 in the lid and also over the filter ring 50 to effectively seal the brewing substance in the pouch 40. The cover 84 helps to retain the freshness of the coffee or tea prior to the use of the brewing device. When it is desired to brew the beverage, the cover 84 is removed from the brewing device 10 and the brewing device is positioned over a container 14 containing a liquid. In most applications the liquid in the container 14 is hot water. Once the lid 28 of the brewing device 10 is positioned over the container 14, the line 64 is released so that the line can advance into the interior of the pouch 40 and the pouch 40 is allowed to extend until it is in the brewing position shown in FIG. 1. In the brewing position liquid is allowed to pass through the permeable pouch 40 and to extract flavoring from the brewing substance 42 contained in the pouch 40. The pouch 40 is constructed of a suitable material, as previously described, which allows the hot water to enter the pouch 40 to act upon the brewing substance 42 and to extract flavor therefrom. However, the pouch 40 does not allow the brewing substance 42 to pass from the pouch 40 into the container 14. The filter ring 50 positioned on the second end 46 of the pouch 40, assists in advancing the pouch to the fully extended brewing position shown in FIG. 1.

It is also possible to place the brewing device 10 over the container 14, release the pouch 40 and add the liquid through the opening 88 in the lid 28. The hinged tab 90 is pivoted from the opening 88 to allow the liquid to enter the container 14. Since the opening 88 is disposed to be in communication with the pouch 40, the liquid enters the pouch and contacts the brewing substance 42. By contacting the brewing substance as the liquid is added to the brewing device this allows the liquid to more easily extract flavor from the brewing substance. In addition, the liquid acts to agitate the brewing substance 42 which further enhances the extraction of flavor from the brewing substance.

After a sufficient brewing time has elapsed, the user advances the line 64 in a direction to cause the filter ring 50 to advance toward the lid 28. As the filter ring 50 advances toward the lid 28 the pouch 40 collapses and the liquid in the pouch 40 is expelled into the container 14. However, the brewing substance 42 is retained within the pouch 40. When the filter ring 50 has been advance to be adjacent the lid 28, the line 64 can be secured to retain the pouch 40 and the brewing substance 42 in this position adjacent the lid 28. The user can then drink the brewing beverage from the container 14 through the drinking opening 74 or the lid 28 can be removed from the container 14 and disposed of. If the lid 28 is left on the container 14, the positioning flange 78 retains the pouch 40 and brewing substance 42 in a position where it does not interfere with the drinking of the brewed beverage from the container 14.

The above detailed description of the present invention is given for the sake of explanation. Various substitutions and modifications, other than those cited, can be made without departing from the scope of the following claims.

We claim:

1. A device for brewing a beverage in a container, said container having an opening on one end, said beverage obtaining its flavor from a brewing substance, said device comprising:
   a lid for positioning over said opening in said container;
   a collapsible liquid permeable pouch secured to said lid, said pouch containing said brewing substance, said pouch being disposed to extend into said container; a perforated portion in communication with said pouch, and
   means for positioning said pouch adjacent said lid when said brewing is completed: said positioning means comprising a line attached to said perforated portion.

2. The device of claim 1 wherein said lid defines a cavity, said cavity being disposed to be adjacent said opening in said container.

3. The device of claim 2 wherein said liquid permeable pouch is positioned in said cavity in said lid when said pouch is in the collapsed position.

4. The device of claim 3 wherein a flange extends from said lid and defines said cavity.

5. The device of claim 4 wherein said pouch has a first opening, said first opening in said pouch being secured to said flange in said lid to secure said pouch to said lid.

6. A device for brewing a beverage in a container, said container having an opening on one end, said beverage obtaining its flavor from a brewing substance, said device comprising:
   a lid for positioning over said opening in said container; said lid defining a cavity, said cavity being disposed adjacent said opening in said container;
   a collapsible liquid permeable pouch secured to said lid, said pouch containing said brewing substance, said pouch being disposed to extend into said container; said liquid permeable pouch positioning in said cavity in said lid when said pouch is in the collapsed position, a flange extending from said lid and defining said cavity; said pouch having a first opening, said first opening in said pouch being secured to said flange in said lid to secure said pouch to said lid; and
   means for positioning said pouch adjacent said lid when said brewing is completed.

7. The device of claim 6 wherein said pouch has a second opening, said second opening being spaced apart from said first opening and being disposed to be positioned in said container when said beverage is being brewed.

8. The device of claim 7 wherein a perforated member is positioned in said second opening in said pouch, said pouch being secured to said perforated member.

9. The device of claim 8 wherein said means for positioning said pouch comprises a line that is secured to said perforated member.

10. The device of claim 9 wherein said line extends through said lid whereby advancing said line in a direction toward said lid will cause said pouch to be advanced toward said lid.

11. The device of claim 10 wherein said lid includes means for securing said lid to said opening in said container.

12. The device of claim 11 wherein said lid includes a discharge opening, said discharge opening being disposed to allow said brewed beverage to be discharged from said container after said beverage has been brewed.

13. The device of claim 12 wherein a tab is positioned on said end of said line that extends through said lid, said tab being configured to be positioned over said discharge opening in said lid whereby said tab acts to seal said discharge opening.

14. The device of claim 13 wherein said tab is reusably secured to said lid to seal said discharge opening.

15. A beverage brewing device comprising:
   a lid member; an opening positioned in said lid member;
   a collapsible liquid permeable pouch secured to said lid member, said pouch containing a substance to be brewed, said pouch being disposed to extend from said lid member when said brewing substance is brewed; said opening being in communication with said pouch; and
   means for positioning said pouch adjacent said lid member when said brewing substance is not being brewed.

16. The device of claim 15 wherein said lid defines a cavity, said cavity being disposed to be adjacent said opening in said container.

17. The device of claim 16 wherein said liquid permeable pouch is positioned in said cavity in said lid when said pouch is in the collapsed position.

18. The device of claim 17 wherein said pouch has a first opening, said first opening in said pouch being secured to said lid.

19. The device of claim 18 wherein said pouch has a second opening, said second opening being spaced apart from said first opening and being disposed to be positioned in said container when said beverage is being brewed.

20. The device of claim 15 wherein an opening is positioned in said lid member, said opening being in communication with said pouch.

21. The device of claim 15 wherein a tab is provided for closing said opening in said lid.

22. A beverage brewing device comprising:

a lid;

a collapsible liquid permeable pouch secured to said lid, said pouch containing a substance to be brewed, said pouch being disposed to extend from said lid when said brewing substance is brewed, said liquid permeable pouch positioned in said cavity in said lid when said pouch is in the collapsed position, said pouch having a first opening, said first opening in said pouch being secured to said lid, said pouch having a second opening, said second opening being spaced apart from said first opening and being disposed to be positioned in said container when said beverage is being brewed.

23. The device of claim 22 wherein a perforated member is positioned in said second opening in said pouch, said pouch being secured to said perforated member.

* * * * *